(12) United States Patent
Ke et al.

(10) Patent No.: US 11,027,734 B2
(45) Date of Patent: Jun. 8, 2021

(54) BRAKING CONTROL METHOD, BRAKING SYSTEM AND VEHICLE

(71) Applicant: Acer Incorporated, New Taipei (TW)

(72) Inventors: Liang-Yu Ke, New Taipei (TW); Yu-Min Cheng, New Taipei (TW)

(73) Assignee: Acer Incorporated, New Taipei (TW)

( * ) Notice: Subject to any disclaimer, the term of this patent is extended or adjusted under 35 U.S.C. 154(b) by 14 days.

(21) Appl. No.: 16/408,482

(22) Filed: May 10, 2019

(65) Prior Publication Data

US 2020/0198635 A1 Jun. 25, 2020

(30) Foreign Application Priority Data

Dec. 19, 2018 (TW) .................................. 107145787

(51) Int. Cl.
*B60W 30/18* (2012.01)
*B60W 40/04* (2006.01)
*B60W 50/04* (2006.01)
*B60W 50/00* (2006.01)
(Continued)

(52) U.S. Cl.
CPC .......... *B60W 30/181* (2013.01); *B60W 30/17* (2013.01); *B60W 30/18109* (2013.01); *B60W 40/04* (2013.01); *B60W 50/0098* (2013.01); *B60W 50/045* (2013.01);
(Continued)

(58) Field of Classification Search
CPC . B60T 7/12; B60T 8/172; B60T 7/042; B60T 2201/02; B60T 17/221; B60T 2250/04; B60T 7/22; B60T 2201/03; B60T 8/3275; B60W 30/16; B60W 2530/16; B60W 2720/103; B60W 30/045; B60W 30/17; B60W 30/181; B60W 30/18109;
(Continued)

(56) References Cited

U.S. PATENT DOCUMENTS 5,437,422 A * 8/1995 Newman ............. B61L 27/0038
246/5
6,241,324 B1 * 6/2001 Miyazaki ................ B60T 8/172
303/148

(Continued)

FOREIGN PATENT DOCUMENTS

CN 1590152 3/2005
CN 107206905 9/2017

*Primary Examiner* — Bradley T King
*Assistant Examiner* — Mahbubur Rashid
(74) *Attorney, Agent, or Firm* — JCIPRNET

(57) ABSTRACT

A braking control method for a braking system of a vehicle is provided according to an exemplary embodiment of the disclosure. The braking control method comprises: obtaining a total braking distance and a first speed of the vehicle; obtaining braking delay information related to the braking system, wherein the braking delay information includes first time information and second time information, the first time information reflects a delay time of a braking signal, and the second time information reflects a preparation time for performing a braking operation according to the braking signal by the braking system; obtaining deceleration information according to the total braking distance, the first speed and the braking delay information; generating the braking signal according to the deceleration information; and performing the braking operation according to the braking signal.

10 Claims, 2 Drawing Sheets

(51) Int. Cl.
*B60W 30/17* (2020.01)
*B60K 31/00* (2006.01)

(52) U.S. Cl.
CPC ............... *B60K 2031/0025* (2013.01); *B60W 2050/048* (2013.01); *B60W 2510/18* (2013.01); *B60W 2520/04* (2013.01)

(58) Field of Classification Search
CPC ............ B60W 40/04; B60W 50/0098; B60W 50/045; B60W 2031/0025; B60W 2510/18
See application file for complete search history.

(56) References Cited

U.S. PATENT DOCUMENTS

| | | | | |
|---|---|---|---|---|
| 7,234,786 | B2* | 6/2007 | Mori | B60T 8/4872 303/11 |
| 8,346,453 | B2* | 1/2013 | Ishimoto | B60T 13/147 701/70 |
| 8,509,971 | B1* | 8/2013 | Isailovski | B60T 7/18 701/20 |
| 8,606,478 | B2* | 12/2013 | Samsioe | B60T 7/22 701/93 |
| 2008/0033621 | A1* | 2/2008 | Nakamura | B60W 10/184 701/65 |
| 2009/0198426 | A1* | 8/2009 | Yasui | B60W 10/184 701/70 |
| 2010/0217527 | A1* | 8/2010 | Hattori | B60W 40/105 701/301 |
| 2014/0358371 | A1* | 12/2014 | Kikuchi | B60G 17/0165 701/37 |
| 2015/0151725 | A1* | 6/2015 | Clarke | B60W 30/14 701/28 |
| 2015/0232099 | A1* | 8/2015 | Miller | B60W 10/18 701/70 |
| 2015/0336607 | A1* | 11/2015 | Inoue | B60W 40/114 701/41 |
| 2018/0038952 | A1* | 2/2018 | Shokonji | G01S 15/86 |
| 2018/0273047 | A1* | 9/2018 | Wang | B60W 30/18154 |
| 2018/0284790 | A1* | 10/2018 | Ichikawa | B60W 30/14 |
| 2018/0304828 | A1* | 10/2018 | Kitani | B60W 50/0205 |

* cited by examiner

BRAKING CONTROL METHOD, BRAKING SYSTEM AND VEHICLE

CROSS-REFERENCE TO RELATED APPLICATION

This application claims the priority benefit of Taiwan application serial no. 107145787, filed on Dec. 19, 2018. The entirety of the above-mentioned patent application is hereby incorporated by reference herein and made a part of this specification.

BACKGROUND

Technical Field

The disclosure relates to a braking control technology, and particularly relates to a braking control method, a braking system and a vehicle.

Description of Related Art

Automated driving of vehicles has gradually become the focus of future transportation technology, and braking systems are also very important in autonomous driving technology. In general, more sophisticated braking system will include more control elements, causing signal transmission and/or component operation to be delayed in the braking system. If the delay is more serious, it may cause passengers to feel uncomfortable during the braking process, or even cause a car accident if the braking force is not enough.

SUMMARY

A braking control method, a braking system and a vehicle are provided according to embodiments of the disclosure, which are capable of solving the problems mentioned above.

A braking control method for a braking system of a vehicle is provided according to an exemplary embodiment of the disclosure. The braking control method comprises: obtaining a total braking distance and a first speed of the vehicle; obtaining braking delay information related to the braking system, wherein the braking delay information includes first time information and second time information, the first time information reflects a delay time of a braking signal, and the second time information reflects a preparation time for performing a braking operation according to the braking signal by the braking system; obtaining deceleration information according to the total braking distance, the first speed and the braking delay information; generating the braking signal according to the deceleration information; and performing the braking operation according to the braking signal.

A braking system for a vehicle is provided according to an exemplary embodiment of the disclosure. The braking system includes a braking device and a braking controller. The braking device is configured to perform a braking operation according to a braking signal. The braking controller is coupled to the braking device and configured to obtain a total braking distance and a first speed of the vehicle. The braking controller is further configured to obtain braking delay information which comprises first time information and second time information. The first time information reflects a delay time of the braking signal, and the second time information reflects a preparation time for performing the braking operation according to the braking signal by the braking device. The braking controller is further configured to obtain deceleration information according to the total braking distance, the first speed and the braking delay information. The braking controller is further configured to generate the braking signal according to the deceleration information.

A vehicle is provided according to an exemplary embodiment of the disclosure. The vehicle includes a braking system which is configured to perform a braking operation according to a braking signal. The braking system is further configured to obtain a total braking distance and a first speed of the vehicle. The braking system is further configured to obtain braking delay information which comprises first time information and second time information. The first time information reflects a delay time of the braking signal, and the second time information reflects a preparation time for performing the braking operation according to the braking signal by the braking system. The braking system is further configured to obtain deceleration information according to the total braking distance, the first speed and the braking delay information. The braking system is further configured to generate the braking signal according to the deceleration information.

Based on the above, after the delay time of the braking signal and the preparation time for performing the braking operation according to the braking signal by the braking system are considered, the deceleration information and the corresponding braking signal may be generated. The vehicle may gradually slow down based on a stable and decrease speed according to the braking operation performed based on the braking signal. Therefore, the uncomfortable feeling of passengers during a braking process may be reduced.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
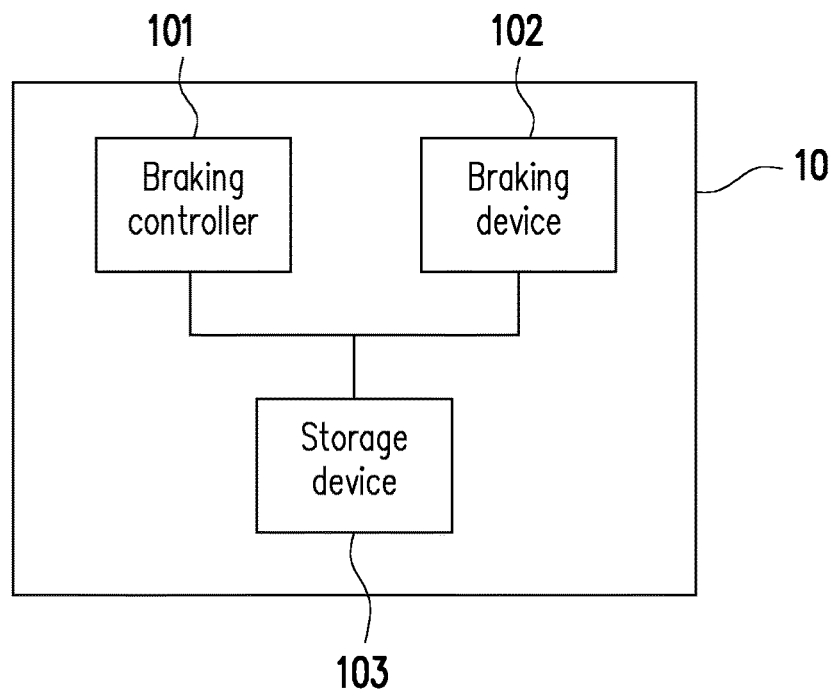
FIG. 1 is a schematic diagram of a braking system according to an embodiment of the disclosure.

FIG. 1 is a schematic diagram of a braking system according to an embodiment of the disclosure. Referring to FIG. 1, in an embodiment, a braking system 10 may be deployed in various types of vehicles, such as cars, buses, or trucks. In an embodiment, the braking system 10 may also be deployed in a transportation vehicle such as a MRT, a subway, or a train. The disclosure does not limit the type of vehicle in which the braking system 10 is equipped.

The braking system 10 includes a braking controller 101, a braking device 102, and a storage device 103. The braking controller 101 may be a central processing unit (CPU) or other programmable general purpose or special purpose microprocessor, digital signal processor (DSP), programmable controller, special application integrated circuit, programmable logic device or other similar devices or combinations of these devices. In an embodiment, the braking controller 101 may control the overall or partial operations of the braking system 10.

The braking device 102 is coupled to the braking controller 101. The braking controller 101 may control the braking device 102 to perform a braking operation. For example, the braking controller 101 may transmit a braking signal to the braking device 102 to instruct the braking device 102 to perform the braking operation. The braking operation is used to gradually reduce the speed of the moving vehicle from the current speed.

The braking device 102 may include one or more braking elements. The braking elements may apply a force (also known as a braking force) to the vehicle to resist the mechanical action of the vehicle (e.g., the rotation of the wheels). The braking force may be presented in a form of friction, electromagnetic or hydraulic pressure. Different braking forces may correspond to different braking depths. The deeper the braking depth, the stronger the braking force applied. In addition, the braking device 102 may also include an electronic or mechanical component used to assist in performing the braking operation, such as a braking activation device and/or a speed reducer, and these components are not described herein.

The storage device 103 is coupled to the braking controller 101 and is used to store data. For example, the storage device 103 may include a volatile storage medium and a non-volatile storage medium. The volatile storage medium may be a random access memory (RAM), and the non-volatile storage medium may be a read only memory (ROM), a solid state disk (SSD) or a conventional hard disk drive (HDD).

The braking controller 101 may obtain information (also referred to as braking delay information) related to the braking system 10. The braking delay information may be stored in the storage device 103. The braking delay information may include time information (also referred to as first time information) which reflects the delay time of the braking signal (also referred to as transmission delay time). For example, after the braking controller 101 determines to perform a braking operation and generate a braking signal, the braking device 102 reacts according to the braking signal (e.g., starts to apply the braking force for deceleration) after the delay time (e.g., 1 second). In other words, during a time range of the delay time (also referred to as a first time range), the braking device 102 does not provide the braking force based on the braking signal. It should be noted that, the transmission delay time may be adjusted according to the practice, and the disclosure is not limited thereto.

The braking delay information may include another time information (also referred to as second time information) which reflects the preparation time (also referred to as braking preparation time) for performing the braking operation according to the braking signal by the braking device 102. For example, after starting to react according to the braking signal, during a time range (also referred to as a second time range) of the preparation time (e.g., 2 seconds), the braking device 102 may provide a gradually increasing (e.g., linearly increasing) braking force for slowing down the vehicle according to the braking signal. It should be noted that, the braking preparation time may be adjusted according to the practice, and the disclosure is not limited thereto. In addition, both the transmission delay time and the brake preparation time may be obtained through actual measurement.

In an embodiment, the braking controller 101 may perform a braking simulation operation. The braking simulation operation may simulate the actual braking operation performed by the braking device 102. The braking controller 101 may update the braking delay information according to the braking simulation operation. For example, when a braking operation of the braking device 102 is simulated, the braking controller 101 may record a time range (i.e., the first time range) between a time point that the braking controller 101 determines to perform the braking operation (or the braking signal is sent) and a time point that the braking device 102 starts to provide the braking force. The braking controller 101 may update the first time information according to the first time range. Furthermore, when the braking operation of the braking device 102 is simulated, the braking controller 101 may also record a time range (i.e., the second time range) between a time point that the braking device 102 starts to provide the braking force and a time point that the braking device 102 provides the entire (or full) braking force. The braking controller 101 may update the second time information according to the second time range. The updated braking delay information may be stored in the storage device 103.

In an embodiment, the braking controller 101 may update the braking delay information based on the braking operation being performed. For example, during the actual traveling of the vehicle and the braking system 10 is operating normally, the braking controller 101 may measure and record the first time range and the second time range when the braking operation is performed. The braking controller 101 may update the braking delay information based on the recorded first time range and the second time range. In other words, in an embodiment, the braking delay information in the storage device 103 may be continuously updated based on each (or at least partially) of the performed braking operations to reflect a change in performance of the braking system 10.

In an embodiment, when the vehicle (or the braking system 10) is activated, the braking controller 101 may read the braking delay information from the storage device 103 for use in subsequent braking operations. In an embodiment, the braking controller 101 may instantly read the braking delay information from the storage device 103 to generate an immediate braking signal.

When it is determined to decelerate the vehicle (or to perform a braking operation), the braking controller 101 may obtain a total braking distance and the current speed of the vehicle (also referred to as a first speed). For example, the braking controller 101 may evaluate a distance between the vehicle and a certain stopping point by a sensor such as an optical radar or a photographic lens. For example, the distance may be a distance between the vehicle and an intersection stop line (or an obstacle). The braking controller 101 may obtain the total braking distance based on the distance. For example, the braking controller 101 may set this distance as the total brake distance. Alternatively, the braking controller 101 may subtract this distance by a predetermined distance to obtain the total braking distance to ensure that the vehicle may stop before the stopping point. In addition, the braking controller 101 may obtain the current speed of the vehicle (i.e., the first speed) by a vehicle speed detector.

The braking controller 101 may obtain deceleration information based on the total braking distance, the first speed, and the braking delay information. For example, the deceleration information may reflect the deceleration for vehicle deceleration during braking operations. The braking controller 101 may generate a braking signal based on the deceleration information. The braking device 102 may perform a braking operation according to the braking signal.

Figure 2:
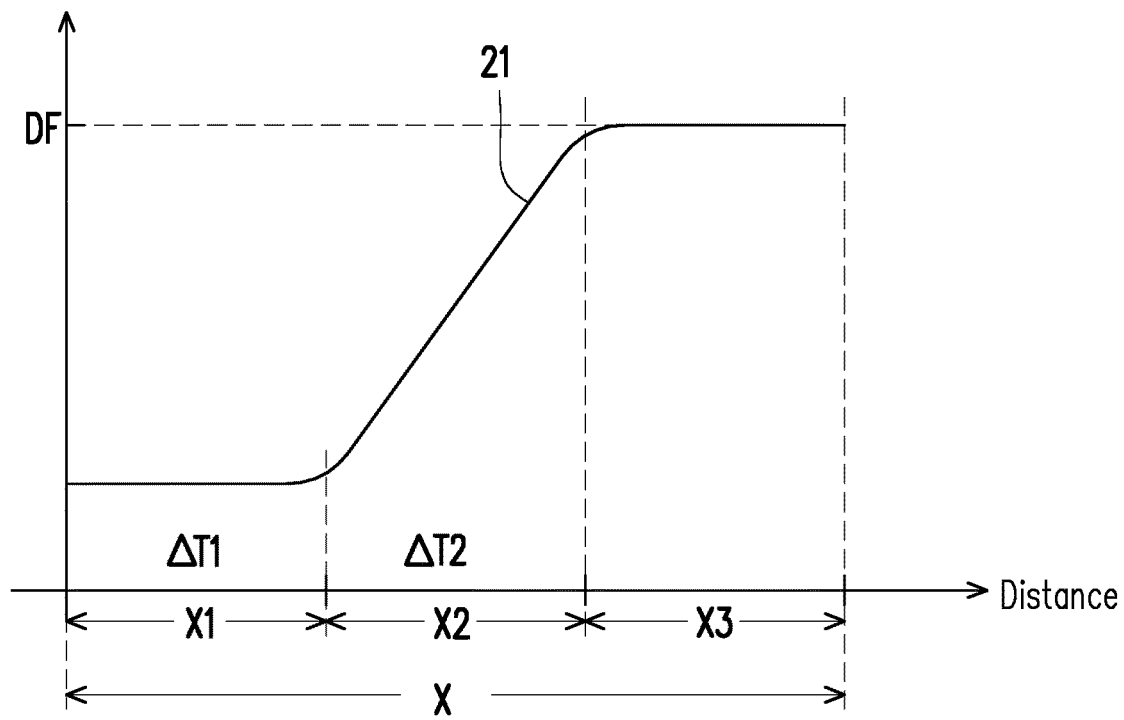
FIG. 2 is a schematic diagram of a braking depth corresponding to a moving distance of a vehicle according to an embodiment of the disclosure.

FIG. 2 is a schematic diagram of a braking depth corresponding to a moving distance of a vehicle according to an embodiment of the disclosure. Referring to FIG. 1 and FIG. 2, the vertical axis represents the braking depth, and the horizontal axis represents the moving distance of the vehicle. A curve 21 reflects the correspondence between the braking depth and the moving distance of the vehicle at different time points after the braking controller 101 determines to perform a braking operation (or generate a braking signal).

Assuming that the final required braking depth is DF and the total braking distance is X, the total braking distance may be X including the distances X1, X2 and X3. After the braking controller 101 determines to perform the braking operation (or generate the braking signal), a moving distance of the vehicle is increased from zero to the distance X1 within the time range $\Delta T1$ (i.e., the first time range). Then, after the braking device 102 begins to provide a linearly increasing braking force, the moving distance of the vehicle increases from the distance X1 to the distance X1+X2 within the time range $\Delta T2$ (i.e., the second time range). After the braking device 102 provides the full braking force corresponding to the braking depth DF, the moving distance of the vehicle increases from the distance X1+X2 to the distance X1+X2+X3 (i.e., the total braking distance X). After the vehicle has moved the total brake distance X, the vehicle stops in response to the braking force provided by the braking device 102.

Traditionally, an automatic braking system does not take into account the additional moving distance of a vehicle due to braking delay and/or motor driving delay (or ABS hydraulic pressurization) (e.g. the distanced X1 and/or X2 in FIG. 2), which may cause the automatic braking system to have an error in the estimation of the stopping point and/or to continuously adjust the deceleration for the brakes to make the passenger uncomfortable. The embodiments of the disclosure considers the braking delay information, so the braking controller 101 can provide accurate and stable deceleration information. For example, the deceleration information may reflect the braking depth DF of FIG. 2. The braking device 102 may control the vehicle to stably decelerate and stop before the stop point based on the deceleration information.

In an embodiment, the braking controller 101 may obtain deceleration information according to the following equations (1.1) and (1.2).

$$A = 4 \times \frac{-B \pm \sqrt{B^2 + \frac{1}{4} \times \Delta T_2^2 \times V_1^2}}{\Delta T_2^2} \quad (1.1)$$

$$B = V_1 \times \Delta T_1 + \frac{1}{2} \times V_1 \times \Delta T_2 - X \quad (1.2)$$

In the equations (1.1) and (1.2), the parameter X represents the total braking distance, the parameter $V_1$ represents the current speed of the vehicle (i.e., the first speed), the parameter $\Delta T_1$ represents the first time range, the parameter $\Delta T_2$ represents the second time range, and the parameters A represents the deceleration corresponding to the deceleration information. The braking controller 101 may generate a braking signal according to the parameter A and instruct the braking device 102 to provide a braking force according to the braking signal (e.g., corresponding to the braking depth DF of FIG. 2) to perform a braking operation.

Figure 3:
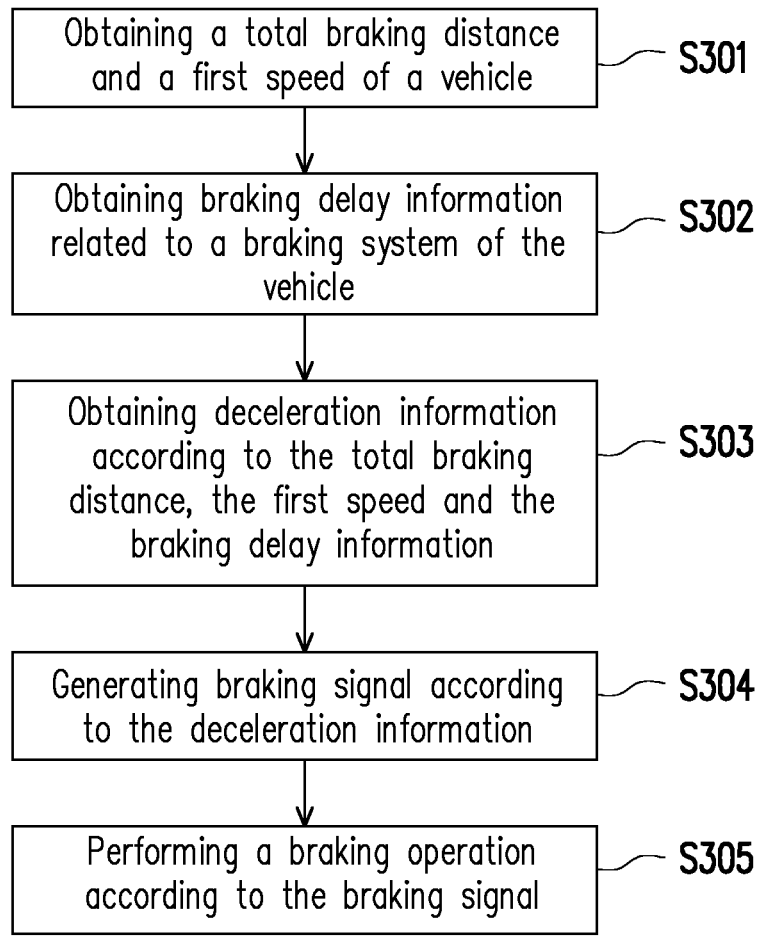
FIG. 3 is a flow chart of a braking control method according to an embodiment of the disclosure.

FIG. 3 is a flow chart of a braking control method according to an embodiment of the disclosure. Referring to FIG. 3, in step S301, a total braking distance and a first speed of a vehicle are obtained. In step S302, braking delay information related to a braking system of the vehicle is obtained. The braking delay information includes first time information and second time information. The first time information reflects a delay time of the braking signal, and the second time information reflects a preparation time for performing the braking operation by the braking system according to the braking signal. In step S303, deceleration information is obtained according to the total braking distance, the first speed, and the braking delay information. In step S304, the braking signal is generated according to the deceleration information. In step S305, the braking operation is performed according to the braking signal.

However, the steps in FIG. 3 have been described in detail above, and will not be described again here. It should be noted that the steps in FIG. 3 may be implemented as multiple codes or circuits, and the present disclosure is not limited thereto. In addition, the method of FIG. 3 may be used in combination with the above embodiments, or may be used alone, and the present disclosure is not limited thereto.

In summary, after considering the delay time of the braking signal and the preparation time for the braking system to perform the braking operation according to the braking signal, the deceleration information and the corresponding braking signal may be generated. The braking operation performed in accordance with the braking signal allows the vehicle to gradually decelerate based on a steady deceleration and accurately stop before arriving the preset stopping point. Thereby, the braking system and/or the braking device of the vehicle may be effectively improved, and the discomfort felt by the passenger during the braking process may be reduced.

It will be apparent to those skilled in the art that various modifications and variations may be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A braking control method for a braking system of a vehicle, comprising:
   obtaining a total braking distance and a first speed of the vehicle;
   obtaining a braking delay information related to the braking system, wherein the braking delay information comprises first time information and second time information;
   obtaining deceleration information according to the total braking distance, the first speed and the braking delay information;
   generating a first braking signal according to the deceleration information; and
   performing a braking operation according to the first braking signal to stop the vehicle,
   wherein the first time information corresponds to a first time range between a time point of sending of a second braking signal and a time point of start of providing a braking force by the braking system according to the second braking signal, the second time information corresponds to a second time range in which the braking force is increased according to the second braking signal, and the deceleration information corresponds to a deceleration of the vehicle during the braking operation for stopping the vehicle.

2. The braking control method of claim 1, further comprising:

performing a braking simulation operation and updating the braking delay information according to the braking simulation operation or updating the braking delay information according to the braking operation, wherein the braking simulation operation simulates an actual braking operation performed by the braking system.

3. The braking control method of claim 1, wherein the step of obtaining the total braking distance comprises:

evaluating a distance between the vehicle and a stopping point; and obtaining the total braking distance according to the distance.

4. The braking control method of claim 1, wherein the braking system does not provide the braking force within the first time range, and the braking system provides the braking force which is increased linearly within the second time range.

5. A braking system for a vehicle, comprising:

a braking device, configured to perform a braking operation according to a first braking signal to stop the vehicle; and a braking controller, coupled to the braking device, wherein the braking controller is configured to obtain a total braking distance and a first speed of the vehicle, the braking controller is further configured to obtain a braking delay information, wherein the braking delay information comprises first time information and second time information, the braking controller is further configured to obtain deceleration information according to the total braking distance, the first speed and the braking delay information, and the braking controller is further configured to generate the first braking signal according to the deceleration information, wherein the first time information corresponds to a first time range between a time point of sending of a second braking signal and a time point of start of providing a braking force by the braking system according to the second braking signal, the second time information corresponds to a second time range in which the braking force is increased according to the second braking signal, and the deceleration information corresponds to a deceleration of the vehicle during the braking operation for stopping the vehicle.

6. The braking system of claim 5, wherein the braking controller is further configured to perform a braking simulation operation and update the braking delay information according to the braking simulation operation, wherein the braking simulation operation simulates an actual braking operation performed by the braking system.

7. The braking system of claim 5, wherein the braking controller is further configured to update the braking delay information according to the braking operation.

8. The braking system of claim 5, wherein the operation of obtaining the total braking distance by the braking controller comprises:

evaluating a distance between the vehicle and a stopping point; and obtaining the total braking distance according to the distance.

9. The braking system of claim 5, wherein the braking device does not provide the braking force within the first time range, and the braking device provides the braking force which is increased linearly within the second time range.

10. A vehicle, comprising:

a braking system, configured to perform a braking operation according to a first braking signal to stop the vehicle, wherein the braking system is further configured to obtain a total braking distance and a first speed of the vehicle, the braking system is further configured to obtain a braking delay information, wherein the braking delay information comprises first time information and second time information, the braking system is further configured to obtain deceleration information according to the total braking distance, the first speed and the braking delay information, and the braking system is further configured to generate the first braking signal according to the deceleration information, wherein the first time information corresponds to a first time range between a time point of sending of a second braking signal and a time point of start of providing a braking force by the braking system according to the second braking signal, the second time information corresponds to a second time range in which the braking force is increased according to the second braking signal, and the deceleration information corresponds to a deceleration of the vehicle during the braking operation for stopping the vehicle.

* * * * *